US012600011B2

(12) United States Patent
Lu et al.

(10) Patent No.: US 12,600,011 B2
(45) Date of Patent: Apr. 14, 2026

(54) METHOD FOR PREPARING FLEXIBLE SOL-GEL POLISHING BLOCK

(71) Applicant: HUAQIAO UNIVERSITY, Quanzhou (CN)

(72) Inventors: Jing Lu, Xiamen (CN); Xipeng Xu, Xiamen (CN); Lei Yang, Xiamen (CN); Yun Shen, Xiamen (CN)

(73) Assignee: HUAQIAO UNIVERSITY, Quanzhou (CN)

( * ) Notice: Subject to any disclaimer, the term of this patent is extended or adjusted under 35 U.S.C. 154(b) by 516 days.

(21) Appl. No.: 18/111,128

(22) Filed: Feb. 17, 2023

(65) Prior Publication Data

US 2023/0202000 A1 Jun. 29, 2023

Related U.S. Application Data

(63) Continuation of application No. PCT/CN2021/143448, filed on Dec. 31, 2021.

(30) Foreign Application Priority Data

May 12, 2021 (CN) .......................... 202110520040.9

(51) Int. Cl.
B24D 18/00 (2006.01)
B29C 45/00 (2006.01)
(Continued)

(52) U.S. Cl.
CPC ...... B24D 18/0009 (2013.01); B29C 45/0013 (2013.01); C09K 3/1481 (2013.01);
(Continued)

(58) Field of Classification Search
CPC ........ B24D 18/0009; B24D 3/00; B24D 3/28; B24D 18/00; B24D 18/009;
(Continued)

(56) References Cited

U.S. PATENT DOCUMENTS

| | | |
|---|---|---|
| 5,605,677 A | 2/1997 | Schumann et al. |
| 2009/0312215 A1* | 12/2009 | Glenn .................. C11D 17/003 |
| | | 510/160 |
| 2017/0136604 A1 | 5/2017 | Lu et al. |

FOREIGN PATENT DOCUMENTS

| | | | |
|---|---|---|---|
| CN | 107502199 A | * 12/2017 | ............... C09G 1/02 |
| CN | 108137991 A | 6/2018 | |

(Continued)

OTHER PUBLICATIONS

Machine Translation of CN-107502199-A (Year: 2017).*

(Continued)

*Primary Examiner* — Amber R Orlando
*Assistant Examiner* — Sarah Catherine Case
(74) *Attorney, Agent, or Firm* — Cooper Legal Group, LLC

(57) ABSTRACT

A method for preparing a flexible sol-gel polishing block, the method comprises: (1) adding a gel agent and a 20 μm diamond abrasive into deionized water, and stirring to even to obtain a first material; (2) adding carbon fiber into the first material obtained in the step 1, and mixing to even to obtain a second material; (3) injecting the second material obtained in the step 2 into a mold, and curing to obtain a cured gel; and (4) drying the cured gel to obtain the flexible sol-gel polishing block.

13 Claims, 5 Drawing Sheets

(51) Int. Cl.

| | |
|---|---|
| *C09K 3/14* | (2006.01) |
| *B29K 1/00* | (2006.01) |
| *B29K 105/00* | (2006.01) |
| *B29K 307/04* | (2006.01) |
| *B29K 507/04* | (2006.01) |

(52) U.S. Cl.
CPC ...... *B29K 2001/08* (2013.01); *B29K 2005/00* (2013.01); *B29K 2105/0061* (2013.01); *B29K 2307/04* (2013.01); *B29K 2507/045* (2013.01)

(58) Field of Classification Search
CPC . B29C 45/0013; B29C 67/243; C09K 3/1481; B29K 2001/08; B29K 2005/00; B29K 2105/0061; B29K 2307/04; B29K 2507/045; B24B 37/24
See application file for complete search history.

(56) References Cited

FOREIGN PATENT DOCUMENTS

| | | | |
|---|---|---|---|
| CN | 108601712 | A | 9/2018 |
| CN | 110076704 | A | 8/2019 |
| CN | 110774153 | A | 2/2020 |
| CN | 112123223 | A | 12/2020 |
| EP | 0366051 | A1 | 5/1990 |

OTHER PUBLICATIONS

Corresponding International Patent Application No. PCT/CN2021/143448, International Search Report, date mailed Mar. 24, 2022.
Corresponding International Patent Application No. PCT/CN2021/143448, Written Opinion, date mailed Mar. 24, 2022.

* cited by examiner

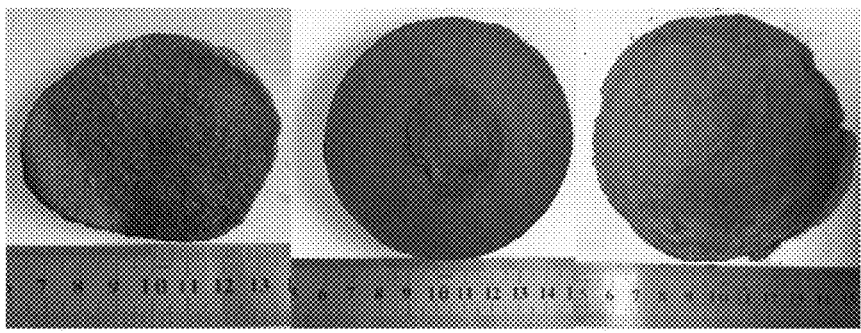
Fig. 1A                    Fig. 1B                    Fig. 1C
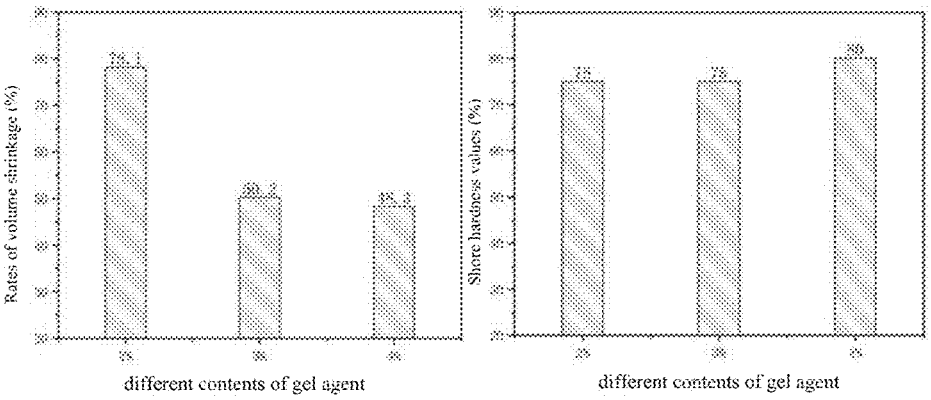
Fig. 2A                                        Fig. 2B
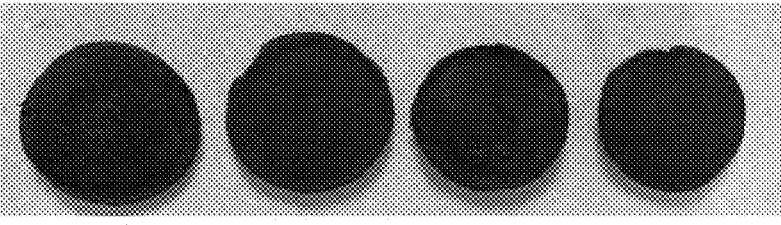
Fig. 3A              Fig. 3B              Fig. 3C              Fig. 3D

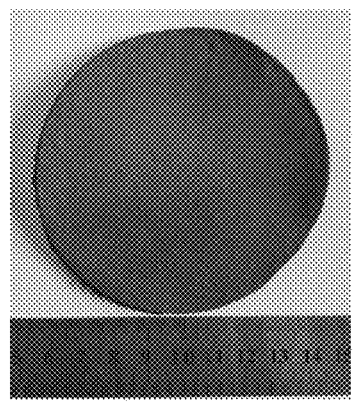
Fig. 4
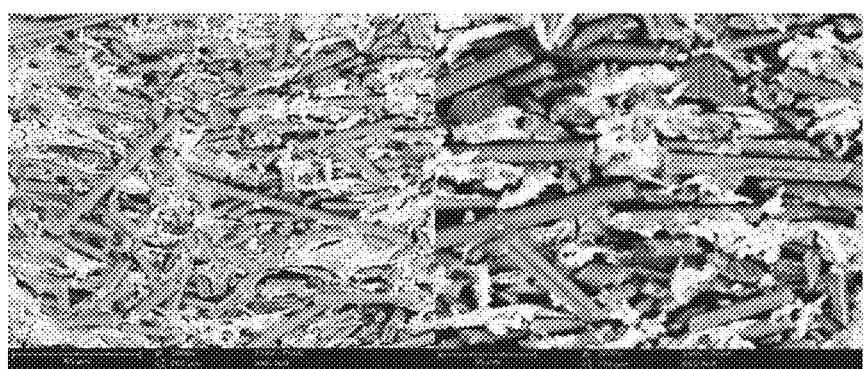
Fig. 5A                                        Fig. 5B
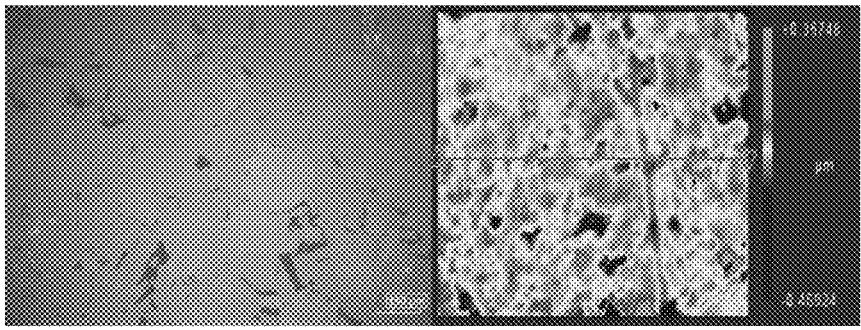
Fig. 6A                                        Fig. 6B

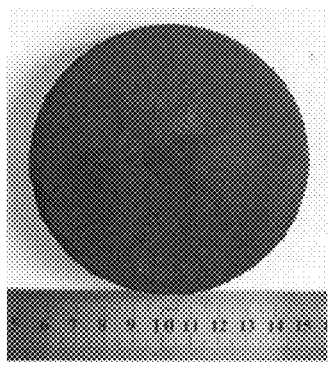
Fig. 7
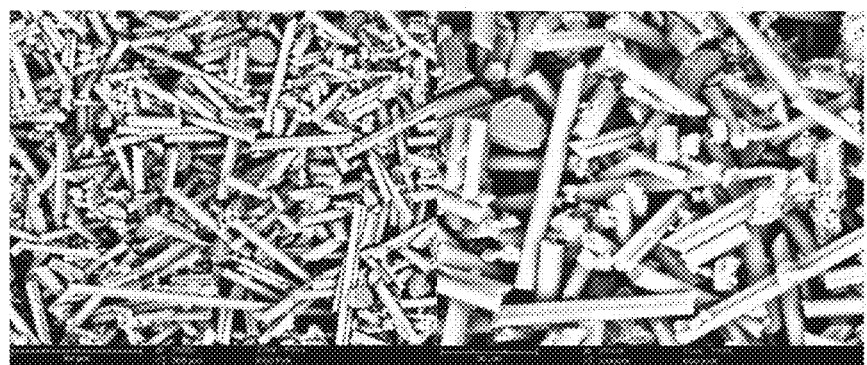
Fig. 8A                    Fig. 8B
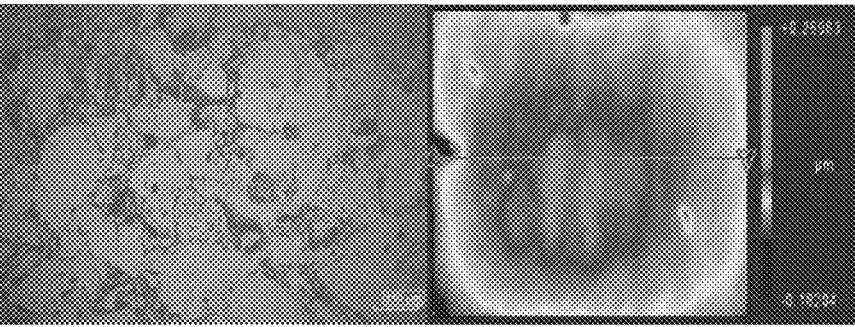
Fig. 9A                    Fig. 9B

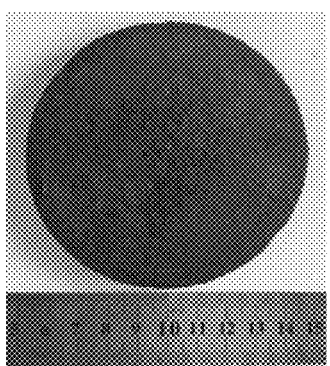
Fig. 10
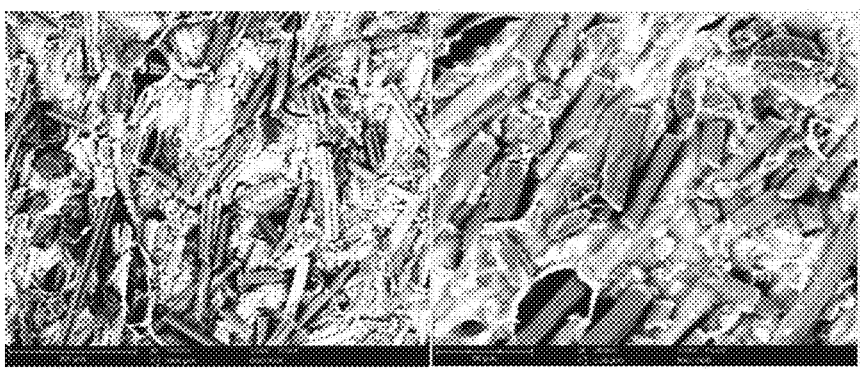
Fig. 11A                    Fig. 11B
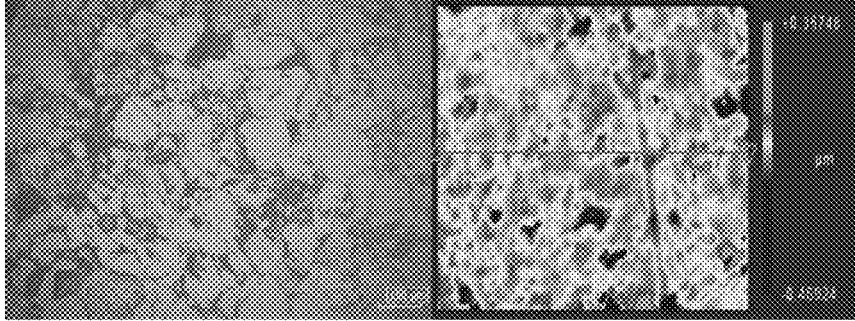
Fig. 12A                    Fig. 12B

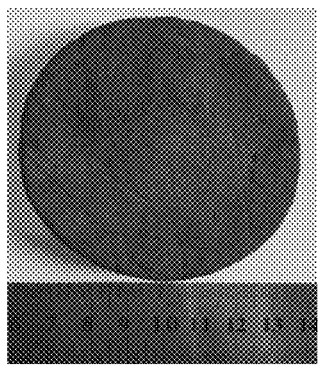
Fig. 13
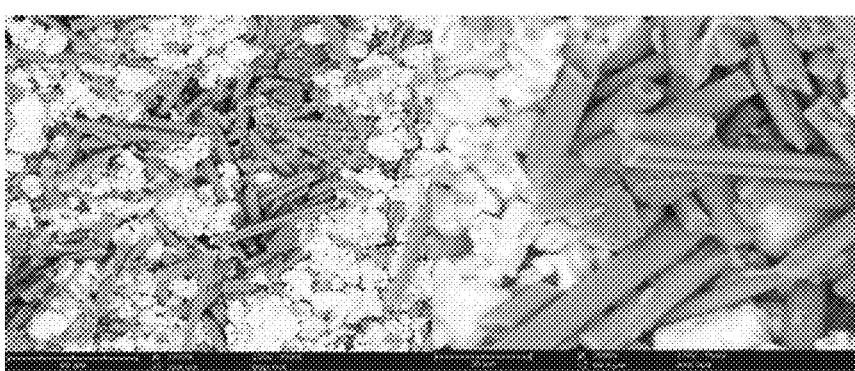
Fig. 14A                  Fig. 14B
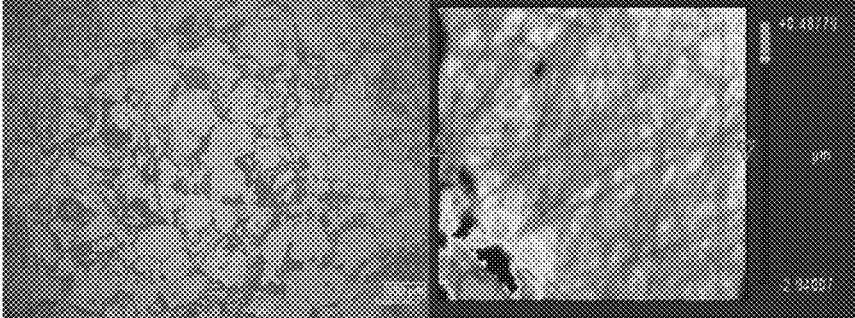
Fig. 15A                  Fig. 15B

METHOD FOR PREPARING FLEXIBLE SOL-GEL POLISHING BLOCK

RELATED APPLICATIONS

This application is a continuation of International patent application PCT/CN2021/143448, filed on Dec. 31, 2021, which claims priority to Chinese patent application 202110520040.9, filed May 12, 2021. International patent application PCT/CN2021/143448 and Chinese patent application 202110520040.9 are incorporated herein by reference.

FIELD OF THE DISCLOSURE

The present disclosure relates to a technical field of precision machining of hard materials, and in particular relates to a method for preparing a flexible sol-gel polishing block.

BACKGROUND OF THE DISCLOSURE

In the traditional high-precision machining field, free abrasive machining and fixed abrasive machining are the two main methods for high-precision machining. The free abrasive machining has difficulty achieving high machining efficiency and good machining quality at the same time, and wasted polishing liquid in the free abrasive machining will seriously pollute the environment. Although the fixed abrasive machining can improve machining efficiency, the abrasives have difficulty being evenly distributed in a binder, a service life of a grinding machine is short, and hard damage of a work piece is prone to occur.

With respect to problems occurring in free abrasive polishing and fixed abrasive polishing, in order to solve an agglomeration problem when using ultra-fine abrasives, a semi-fixed abrasive polishing method is provided in the existing technologies, that is, polishing tools for machining are prepared using a sol-gel principle. The semi-fixed abrasive polishing method differs from a chemical mechanical polishing method in that biopolymer materials and fiber substrates are combined for polishing. The semi-fixed abrasive polishing method not only has environmental protection characteristics, but the semi-fixed abrasive polishing method also can improve machining precision. Therefore, the semi-fixed abrasive polishing method has great advantages and prospects for the future in the semiconductor field and the stone polishing field.

In the past, in research of sol-gel polishing tools used in the semi-fixed abrasive polishing method, gel is generally coated on a surface of a fiber pad or non-woven fabrics, then cured, and dried for polishing. Although polishing effects of the sol-gel polishing tools obtained by the aforementioned method are significant, a service life of the sol-gel polishing tools is short during use due to only a surface being coated with a layer of gel, which cannot meet requirements of continuous long-term machining. In addition, driven by environmental protection goals, waterless machining requirements increase, and the existing sol-gel polishing tools are easily damaged in waterless machining. Furthermore, in order to further improve the polishing precision and meet industrialization requirements of the polishing tools, a new method for preparing the sol-gel polishing tools is urgently needed.

BRIEF SUMMARY OF THE DISCLOSURE

An objective of the present disclosure is to provide a method for preparing a flexible sol-gel polishing block to solve deficiencies of the existing techniques.

A technical solution of the present disclosure is as follows:

A method for preparing a flexible sol-gel polishing block, comprising:

(1) adding a gel agent and a 20 μm (i.e., W20) diamond abrasive into deionized water, and stirring to even to obtain a first material, wherein the gel agent is at least one of λ carrageenan, gellan gum, sodium carboxymethyl cellulose, or konjac gum;

(2) adding a gel skeleton into the first material obtained in the step 1, and mixing to even to obtain a second material;

(3) slowly injecting the second material obtained in the step 2 into a mold, and curing to obtain a cured gel; and (4) drying the cured gel to obtain the flexible sol-gel polishing block, wherein in the flexible sol-gel polishing block, a content of the 20 μm diamond abrasive is 9-11 wt %, a content of the gel agent is 2.9-3.1 wt %, and a content of the gel skeleton is 30-40 wt %.

In a preferred embodiment of the present disclosure, the gel agent is the λ carrageenan, and the curing comprises immersing in a KCl solution.

In a preferred embodiment of the present disclosure, the gel agent is the konjac gum, and the curing comprises immersing in a $CaCl_2$ solution.

In a preferred embodiment of the present disclosure, the gel agent is the sodium carboxymethyl cellulose, and the curing comprises immersing in an $Al_2(SO_4)_3$ solution.

In a preferred embodiment of the present disclosure, the gel agent is the gellan gum, and the curing comprises immersing in a KCl solution.

In a preferred embodiment of the present disclosure, in the flexible sol-gel polishing block, the content of the gel agent is 3 wt % and the content of the gel skeleton is 30 wt %.

In a preferred embodiment of the present disclosure, the gel skeleton is carbon fiber.

In a preferred embodiment of the present disclosure, the carbon fiber is 400-mesh carbon fiber.

According to the present disclosure:

1. In the present disclosure, when the flexible sol-gel polishing block is prepared, a specific proportion of the carbon fiber is added, so that the flexible sol-gel polishing block has a porous structure, and machining effects of a polishing tool comprising the flexible sol-gel polishing block is improved.

2. The flexible sol-gel polishing block prepared by the present disclosure is no longer merely a layer of coating on the surface, but a whole substrate that can be used for polishing, which improves a service life of the polishing tool comprising the flexible sol-gel polishing block.

BRIEF DESCRIPTION OF THE DRAWINGS

FIGS. 1A-1C illustrate photos of gel agglomerations prepared using different contents of a gel agent of Embodiment 1 of the present disclosure.

FIGS. 2A and 2B illustrate characteristics comparison charts of the gel agglomerations prepared using the different contents of the gel agent of Embodiment 1 of the present disclosure.

FIGS. 3A-3D illustrate photos of gel agglomerations prepared using different contents of carbon fiber of Embodiment 2 of the present disclosure.

FIG. 4 illustrates a photo of a gel agglomeration prepared using konjac gum as a gel agent of Embodiment 3 of the present disclosure.

FIGS. 5A and 5B illustrate views of a microscopic morphology of the gel agglomeration prepared using the konjac gum as the gel agent of Embodiment 3 of the present disclosure.

FIGS. 6A and 6B illustrate views of a marble that is polished by the gel agglomeration prepared using the konjac gum as the gel agent of Embodiment 3 of the present disclosure.

FIG. 7 illustrates a photo of a gel agglomeration prepared using sodium carboxymethyl cellulose as a gel agent of Embodiment 4 of the present disclosure.

FIGS. 8A and 8B illustrate views of a microscopic morphology of the gel agglomeration prepared using the sodium carboxymethyl cellulose as the gel agent of Embodiment 4 of the present disclosure.

FIGS. 9A and 9B illustrate views of a marble that is polished by the gel agglomeration prepared using the sodium carboxymethyl cellulose as the gel agent of Embodiment 4 of the present disclosure.

FIG. 10 illustrates a photo of a gel agglomeration using gellan gum as a gel agent of Embodiment 5 of the present disclosure.

FIGS. 11A and 11B illustrate views of a microscopic morphology of the gel agglomeration prepared using the gellan gum as the gel agent of Embodiment 5 of the present disclosure.

FIGS. 12A and 12B illustrate views of a marble that is polished by the gel agglomeration prepared using the gellan gum as the gel agent of Embodiment 5 of the present disclosure.

FIG. 13 illustrates a photo of a gel agglomeration prepared using λ carrageenan as a gel agent of Embodiment 6 of the present disclosure.

FIGS. 14A and 14B illustrate views of a microscopic morphology of the gel agglomeration prepared using the λ carrageenan as the gel agent of Embodiment 6 of the present disclosure.

FIGS. 15A and 15B illustrate views of a marble that is polished by the gel agglomeration prepared using the λ carrageenan as the gel agent of Embodiment 6 of the present disclosure.

DETAILED DESCRIPTION OF THE EMBODIMENTS

The technical solution of the present disclosure will be further described below in combination with the accompanying embodiments and drawings.

The method for preparing a gel agglomeration in the following embodiments comprises the following steps:

(1) A gel agent and a 20 μm (i.e., W20) diamond abrasive (except in Embodiments 1 and 2) are added into deionized water and stirred to even to obtain a first material. The gel agent is at least one of carrageenan, gellan gum, sodium carboxymethyl cellulose, or konjac gum;

(2) 400-mesh carbon fiber is added into the first material obtained in the step 1 and mixed to even to obtain a second material;

(3) The second material obtained in the step 2 is slowly injected into a mold for curing to obtain a cured gel; and (4) The cured gel is dried to obtain the gel agglomeration (i.e., a flexible sol-gel polishing block) for polishing.

Embodiment 1

λ carrageenan is selected as a research object, and a content of carbon fiber is controlled to be 30 wt % to prepare gel agglomerations (i.e., a flexible sol-gel polishing block). A specific method for preparing the gel agglomerations is discussed with respect to Embodiment 6, and an influence on the preparation of the gel agglomerations using different contents of a gel (i.e., a gel agent) is studied. FIGS. 1A-1C illustrate gel agglomerations prepared by respectively adding 2 wt %, 3 wt %, and 4 wt % of the gel. Referring to FIGS. 1A-1C, when a content of the gel is 2 wt % or 4 wt %, corresponding two gel agglomerations of the gel agglomerations deform and severely shrink. When the content of the gel is 3 wt %, a complete shape of a corresponding gel agglomeration of the gel agglomerations is maintained. FIGS. 2A and 2B illustrate rates of volume shrinkage and Shore hardness values of different contents of the gel. Referring to FIGS. 2A and 2B, when the content of the gel is 2 wt %, a corresponding rate of the rates of the volume shrinkage is larger. However, when the content of the gel is 3 wt % or 4 wt %, corresponding two rates of the rates of the volume shrinkage change slightly. Shore hardness values change slightly relative to a variation of the content of the gel. Therefore, as a result, when the content of the gel is 3 wt %, a corresponding gel agglomeration has best performance.

Embodiment 2

λ carrageenan gel is selected as a gel (i.e., a gel agent), and carbon fiber is selected as a gel skeleton. A content of the gel is 3 wt %. Influence on a preparation of gel agglomerations (i.e., a flexible sol-gel polishing block) by adding different contents of carbon fiber is studied, and a specific preparation method is discussed with respect to Embodiment 6. According to the existing experience, contents of the carbon fiber are respectively 10 wt %, 20 wt %, 30 wt %, and 40 wt %. FIGS. 3A-3D illustrate views of the gel agglomerations prepared using different contents of the carbon fiber. When contents of the carbon fiber is 10 wt % or 20 wt %, deformation degrees of corresponding agglomerations of the gel agglomerations are larger. When the contents of the carbon fiber are 30 wt % or 40 wt %, deformation degrees of corresponding gel agglomerations of the gel agglomerations are smaller. Table 1 illustrates performance of the gel agglomerations prepared by different contents of the carbon fiber. When a content of the carbon fiber increases, the performance gradually increases. When the content of the carbon fiber is 30 wt % or 40 wt %, the performance is basically stable. Therefore, from an economic perspective, it is appropriate that the content of carbon fiber is selected to be 30 wt %.

TABLE 1

| The performance of the gel agglomerations prepared by the different contents of the carbon fiber | | | |
|---|---|---|---|
| Contents of the carbon fiber (wt %) | Shore hardness (Ha) | Rate of volume shrinkage (%) | Compressive strength (MPa) |
| 0 | 50 | 89.9 | 11.5 |
| 10 wt % | 65 | 76.1 | 20.3 |

5

TABLE 1-continued

The performance of the gel agglomerations prepared
by the different contents of the carbon fiber

| Contents of the carbon fiber (wt %) | Shore hardness (Ha) | Rate of volume shrinkage (%) | Compressive strength (MPa) |
|---|---|---|---|
| 20 wt % | 70 | 68.4 | 31.2 |
| 30 wt % | 85 | 50.2 | 40.1 |
| 40 wt % | 85 | 49.8 | 40.4 |

Embodiment 3

At room temperature (e.g., 20-25° C.), 3 g of konjac gum, 30 g of carbon fiber, and 10 g of 20 μm (i.e., W20) diamond abrasive are added into 100 mL of deionized water and stirred for 8 hours to be mixed to even to obtain a mixed solution. 0.5 mol/L of a $CaCl_2$ solution is prepared, the mixed solution is slowly added into a circular mold, and the circular mold is added into the $CaCl_2$ solution and left to stand for 3 hours to obtain cured gel agglomerate at room temperature. Finally, the cured gel agglomerate is dried for 72 hours to obtain a dried gel agglomerate (i.e., a flexible sol-gel polishing block) at room temperature and normal pressure (e.g., 101 kPa). The dried gel agglomerate is shown in FIG. 4, and a microscopic morphology of the dried gel agglomerate is shown in FIGS. 5A and 5B. A surface morphology of a marble polished by the dried gel agglomerate is shown in FIGS. 6A and 6B, wherein a polishing pressure is 15 N, a polishing speed is 100 revolutions/minute, and a polishing time is 14 minutes. Embodiments 4-6 described below have the same machining parameters. A surface roughness of the marble is about 35 nm, and a surface gloss value of the marble is about 88.

Embodiment 4

At room temperature, a product with 30 wt % of carbon fiber is selected, 6 g of sodium carboxymethyl cellulose and 20 g of 20 μm (i.e., W20) diamond abrasive are added into 200 mL of deionized water and stirred to even to obtain a mixture, and 60 g of the carbon fiber is added into the mixture and stirred for 8 hours to be mixed to even to obtain a mixed solution. 0.5 mol/L of $Al_2(SO_4)_3$ solution is prepared, the mixed solution is slowly added into a circular mold, and the circular mold is put into the $Al_2(SO_4)_3$ solution and left to stand for 3 hours to obtain sodium carboxymethyl cellulose gel at room temperature. The sodium carboxymethyl cellulose gel is finally taken out and put into a freeze dryer. A freezing temperature is lower than −40° C., a freezing time is 8 hours, a drying time is set to be 10 hours, a vacuum pressure is less than 15 Pa, and an environmental temperature is 15° C., then a gel agglomeration (i.e., a flexible sol-gel polishing block) is obtained, as shown in FIG. 7. A microscopic morphology of the gel agglomeration is shown in FIGS. 8A and 8B. The gel agglomeration has elasticity, good hydrophobicity, and a porous structure, is able to withstand a certain pressure, and has remarkable effects in polishing experiments. Polishing effects of a marble are shown in FIGS. 9A and 9B. A surface roughness of the marble polished by the gel agglomeration is 27.552 nm, and a gloss value is 90. A standard gloss value of the marble in factory settings is about 80.

Embodiment 5

At room temperature, 6 g of gellan gum and 20 g of 20 μm (i.e., W20) diamond abrasive are added into 200 mL of deionized water and stirred to even to obtain a mixture, and 60 g of carbon fiber is then added into the mixture and stirred for 7 hours to be mixed to even to obtain a mixed solution. 0.5 mol/L of a KCl solution is prepared, the mixed solution is slowly added into a circular mold, and the circular mold is put into the KCl solution and left to stand for 5 hours to obtain a gellan gum gel at room temperature. The gellan gum gel is finally taken out and dried with microwaves to obtain a gellan gum gel agglomeration (i.e., a flexible sol-gel polishing block), and a drying time is 2 hours. The gellan gum gel agglomeration is shown in FIG. 10, and a microscopic morphology of the gellan gum gel agglomeration is shown in FIGS. 11A and 11B. The gellan gum gel agglomeration has elasticity, good hydrophobicity, and a porous structure, is able to withstand a certain pressure, and has remarkable effects in polishing experiments. Polishing effects of a marble are shown in FIGS. 12A and 12B. A roughness of the marble polished by the gel agglomeration is 30.378 nm, a measured average gloss value is 92, and a standard gloss value of the marble in factory settings is about 80.

Embodiment 6

At room temperature and normal pressure, 6 g of λ carrageenan and 20 g of 20 μm (i.e., W20) diamond abrasive are added into 200 mL of deionized water and stirred to even to obtain a mixture. 60 g of carbon fiber is then added into the mixture and stirred to be mixed to even to obtain a mixed solution, and a stirring time is 7 hours. 0.5 mol/L of a KCl solution is prepared, the mixed solution is slowly added into a circular mold, and the circular mold is put into the KCl solution and left to stand for 3 hours to obtain a carrageenan gel at room temperature. The carrageenan gel is finally taken out and dried in an oven with hot air at 50° C. for 2 hours to obtain a carrageenan gel agglomeration (i.e., a flexible sol-gel polishing block). The carrageenan gel agglomeration is shown in FIG. 13, and a microscopic morphology of the carrageenan gel agglomeration is shown in FIGS. 14A and 14B. The carrageenan gel agglomeration has remarkable effects in polishing experiments. Polishing effects of a marble are shown in FIGS. 15A and 15B. A roughness of the marble polished by the carrageenan gel agglomeration is 30.378 nm, a measured average gloss value is 92, and a standard gloss value of the marble in factory settings is about 80.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A method for preparing a flexible sol-gel polishing block, comprising:
   (1) adding a gel agent and an abrasive into deionized water, and stirring to even to obtain a first material, wherein the gel agent is at least one of λ carrageenan, gellan gum, sodium carboxymethyl cellulose, or konjac gum;
   (2) adding a skeleton for the gel agent into the first material obtained in the step 1, and mixing to even to obtain a second material;
   (3) injecting the second material obtained in the step 2 into a mold, and curing the mold containing the second material to obtain a cured gel; and (4) drying the cured gel to obtain the flexible sol-gel polishing block, wherein in the flexible sol-gel polishing block, a content of the abrasive is 9-11 wt %, a content of the gel agent is 2.9-3.1 wt %, and a content of the skeleton for the gel agent is 30-40 wt %.

2. The method according to claim 1, wherein:

the gel agent is the λ carrageenan, and the curing comprises immersing the mold containing the second material in a KCl solution.

3. The method according to claim 1, wherein:

the gel agent is the konjac gum, and the curing comprises immersing the mold containing the second material in a $CaCl_2$ solution.

4. The method according to claim 1, wherein:

the gel agent is the sodium carboxymethyl cellulose, and the curing comprises immersing the mold containing the second material in an $Al_2(SO_4)_3$ solution.

5. The method according to claim 1, wherein:

the gel agent is the gellan gum, and the curing comprises immersing the mold containing the second material in a KCl solution.

6. The method according to claim 1, wherein:

in the flexible sol-gel polishing block, the content of the gel agent is 3 wt % and the content of the skeleton for the gel agent is 30 wt %.

7. The method according to claim 2, wherein:

in the flexible sol-gel polishing block, the content of the gel agent is 3 wt % and the content of the skeleton for the gel agent is 30 wt %.

8. The method according to claim 3, wherein:

in the flexible sol-gel polishing block, the content of the gel agent is 3 wt % and the content of the skeleton for the gel agent is 30 wt %.

9. The method according to claim 4, wherein:

in the flexible sol-gel polishing block, the content of the gel agent is 3 wt % and the content of the skeleton for the gel agent is 30 wt %.

10. The method according to claim 5, wherein:

in the flexible sol-gel polishing block, the content of the gel agent is 3 wt % and the content of the skeleton for the gel agent is 30 wt %.

11. The method according to claim 1, wherein the skeleton for the gel agent is carbon fiber.

12. The method according to claim 11, wherein the carbon fiber is 400-mesh carbon fiber.

13. The method according to claim 1, wherein the abrasive is diamond particles having an average diameter of 20 μm.

* * * * *